United States Patent Office 3,737,405
Patented June 5, 1973

3,737,405
POLYMERIZABLE COMPOSITIONS WITH IMPROVED ADHESION CONTAINING DI- OR TRIPROPYLENE GLYCOL
Joseph Linder and Mel M. Gallant, both % Fibre Glass-Evercoat Company, Inc., 6600 Cornell Road, Cincinnati, Ohio 45242
No Drawing. Continuation-in-part of abandoned application Ser. No. 9,431, Feb. 6, 1970. This application Sept. 2, 1971, Ser. No. 177,458
Int. Cl. C08g 51/04
U.S. Cl. 260—40 R         8 Claims

ABSTRACT OF THE DISCLOSURE

The addition of dipropylene glycol and tripropylene glycol to unsaturated polyester-vinyl monomer compositions with talc improves adhesion to metal and shortens the time for development of adhesion.

---

This application is a continuation-in-part of copending application Ser. No. 9,431 filed Feb. 6, 1970, now abandoned.

This invention relates to new polymerizable compositions.

It is an object of this invention to provide compositions that have superior adhesion to metal on polymerization.

It is a further object of this invention to provide compositions that rapidly develop adhesion to metal after initiation of the polymerization.

Compositions of the so-called "polyester resins" containing an inorganic filler such as talc when polymerized adhere strongly to metal surfaces. They are employed extensively in the repair of automobile bodies and are commonly known in the trade as "Auto Body Putties." Polymerization is commonly initiated by mixing an auto body putty with an organic peroxide such as a pasty suspension of benzoyl peroxide which becomes an integral part of the final polymerized composition.

The polyester resin and talc employed to prepare the auto body putty may contain considerable amounts of moisture and the benzoyl peroxide pastes commonly employed often contain 15% or more water. It has been discovered that the moisture content of the auto body putty-benzoyl peroxide paste composition is a critical factor in determining the adhesion of the polymerized composition to metal and particularly this is important during the early stages of the polymerization or cure. The latter is especially important since it determines the time that must elapse before the polymerized composition can be filed or sanded. Poor adhesion is particularly apparent at the edges or featheredge between metal and putty where the putty is very thin. It is here at the featheredge that the putty peels off if there is not strong enough adhesion, giving a rough surface which is unacceptable in the trade. The instant invention that has great commercial advantage since it shortens the time between application of the putty and the time at which sanding can be carried out as well as increases adhesion after polymerization is complete.

Pastes prepared from benzoyl peroxide are currently the most common polymerization initiators employed with auto body putties. The majority of benzoyl peroxide pastes so used, contain 12–18% water in order to facilitate suspension and suppress burning. Benzoyl peroxide pastes (usually 50% concentration) are employed at a level of 1–3% of the auto body putty. In order to obtain good adhesion with common commercial putties, it has been found that the moisture content of the benzoyl paste even at these low concentrations should be below 5% and preferably below 2%, since the moisture in the benzoyl peroxide paste is additive with that already present in the auto body putty. This is especially important since the moisture in the auto body putty is often near the critical level to begin with (1.5%).

The instant invention involves the discovery that dipropylene glycol and tripropylene glycol improve the adhesion of the polymerizing or polymerized auto body putty composition and can be added as an ingredient of either of the two components in the system, namely, the auto body putty and the benzoyl peroxide or other initiator composition. The glycols markedly improve the performance of the composition containing a high percentage of moisture but are effective as well with compositions having a low moisture level. The range of concentration of glycols that has been most effective is between 0.01–3% of the final composition with 0.1–1% the preferred range. The action of the glycol is not known but is thought to involve interaction with traces of moisture that are present in the polymerized composition.

Although benzoyl peroxide is mentioned above where the peroxide or polymerization initiator component is involved, other diacyl and diaroyl peroxides such as p-chlorobenzoyl peroxide, m-chlorobenzoyl peroxide, toluoyl peroxide, lauroyl peroxide and similar peroxides are operative as well as ketone peroxides such as methyl ethyl ketone peroxide, cyclohexanone peroxide, methyl amyl ketone peroxide and pentanedione peroxide. (Concentration of ketone peroxide composition employed to initiate polymerization of auto body putty is from 0.5–3%.) In each case the promoter must match the polymerization initiator employed, as described later herein.

"Auto Body Putty," as the term is employed herein, has a composition of from 40–60% "polyester" resin and from 60–40% talc. The term "polyester resin" is a trade term universally used in the industry and is composed of an unsaturated polyester (chemical term) dissolved in a vinyl monomer, usually styrene. In order to prevent any confusion with a strict chemical interpretation, these resins as described herein will be referred to as "unsaturated polyester-vinyl monomer resins." Among the other vinyl monomers used in addition to styrene are p-methylstyrene, divinylbenzene, methyl and ethyl methacrylate and ring chlorinated styrenes. The unsaturated polyester is commonly prepared by reacting maleic acid or anhydride and o-phthalic acid or anhydride with a glycol, usually propylene glycol. The ratio of maleic to phthalic acid is often 1–1 but may vary considerably depending upon the degree of crosslinking and flexibility desired. Other olefinically unsaturated acids such as fumaric or itaconic acid can be substituted for maleic acid and other non-olefinic acids such as isophthalic or adipic acids can be substituted for o-phthalic acid. Various glycols can be reacted in place of propylene glycol such as mono-, di- and tri-ethylene glycol, di- and tri-propylene glycol and 1,4-butylene glycol. Economic considerations usually dictate the selection of the resin composition originally stated with varying amounts of longer chain glycol and/or dibasic fatty acid to obtain flexibility. When longer chain glycols are employed, the proportion of non-olefinic dibasic acid may be reduced. The selection of the non-olefinic acid and its ratio to olefinic acid and the selection of glycol employed are determined by the physical properties desired in the unsaturated polyester and particularly its solubility in the vinyl monomer and influence on the properties of the final resin such as flexibility. This technology is well known in the art. The concentration of vinyl monomer varies somewhat depending on the unsaturated polyester employed, but usually is in the range of 20–50% of the resin composition.

In addition to the unsaturated polyester chain and vinyl monomer, the resin composition itself will include such other compounds as inhibitors to prevent premature gelation and promoters and anti-tack agents as may be required to ensure proper curing of the resin or initiation by the peroxide compound. Resin compositions will be presumed to contain such materials unless stated otherwise. Typical of inhibitors that are commonly employed are hydroquinone, quinone and tertiary-butyl catechol. The promoter will depend on the peroxide initiator to be utilized. If a diacyl peroxide is employed, the promoter will include a tertiary-dialkyl arylamine such as dimethyl or diethylaniline, dimethyl-p-phenylaniline or dimethyltoluidine. If a ketone peroxide is to be employed, a promoter such as cobalt naphthenate or octoate will be utilized with or without a tertiary arylamine. Also employed are minor portions of copper naphthenate, zinc naphthenate or octoate and perhaps other minor compounds that may affect the curing rate but do not influence the adhesion of the auto body putty. Typical concentrations of inhibitors are from 0.05 to 0.001%; of amines from 0.1 to 1.2% and of soluble metallic soaps, from 0.01 to 1.0%, all well known in the art.

Benzoyl peroxide pastes, the most common polymerization initiator employed with auto body putties, normally utilize as a phlegmatizer or desensitizer, a high-boiling ester which reduces the hazard of the peroxide and facilitates the handling. Typical of esters employed are butyl benzyl phthalate, dibutyl phthalate, dioctyl phthalate and tricresyl phosphate. When water is incorporated into the system in order to further reduce the hazard, emulsifiers are also added. Coloring and thixotropic agents may also be added in small concentrations. The benzoyl peroxide content ranges from 40–55% benzoyl peroxide and 60–30% of ester or ester substitute. Other diacyl and diaroyl peroxides are similarly compounded. Commercial methyl ethyl ketone peroxide ranges from 30–60% methyl ethyl ketone peroxide—usually 60% ketone peroxide, the remainder being largely dimethyl phthalate. Minor portions of other materials including water may be added to assist in phlegmatization along with soluble colors to act as tracers. With the exception of water the other materials commonly added to commercial diacyl peroxide compositions or ketone peroxide compositions do not have a major effect on the adhesion of the auto body putty composition.

Unless otherwise noted methyl ketone peroxide, as the term is employed herein, refers to the common commercial 60% solution.

EXAMPLE 1

An auto body putty prepared from 50% unsaturated polyester-vinyl monomer resin [o-phthalate-maleate (1 mole each) of propylene glycol (2 mole), dissolved in approximately 40% styrene and promoted with 0.5% dimethylaniline] and 50% talc (magnesium silicate) and containing 0.9% water was mixed with 2% of a 50% benzoyl peroxide paste containing a plasticizer and the indicated amounts of water.

| Water content benzoyl peroxide paste, percent | Time to— | | Adhesion at 9 min. |
|---|---|---|---|
| | Gel, min. | Safe featheredging, min. | |
| 15 | 3½ | 10½ | Poor. |
| 10 | 3½ | 9¼ | Fair. |
| 5 | 3¾ | 8¾ | Good. |
| 2 | 4½ | 8½ | Excellent. |
| 1 | 5 | 8 | Do. |

The above example demonstrates that a putty containing some moisture is significantly affected by the additional water content in the benzoyl peroxide. At 15% the featheredging is poor; at 5% it is good, and only fair at 10%.

EXAMPLE 2

A sample of commercial auto body putty was analyzed by the Karl Fischer method. Moisture content 1.3%.

EXAMPLE 3

The addition of dipropylene glycol or tripropylene glycol to a putty gelled with benzoyl peroxide containing a high percentage of water is also effective in improving the time to featheredgeability, especially from gel.

| Tripropylene glycol on putty wt. | Note 2.—Dipropylene glycol, percent on putty wt. | Note 1.—Gel time, min. | Time to featheredge, min. |
|---|---|---|---|
| | 0 | 5½ | 9¼ |
| | 0.5 | 5 | 8¾ |
| | 1 | 4¾ | 8½ |
| 0.2 | | 5 | 8¾ |

Note 1.—Putty gelled with benzoyl peroxide containing 12% water content.
Note 2.—1% dipropylene glycol softens the resultant product. This can be used as a technique to soften putties. Beyond a 3% addition putties become very soft.

EXAMPLE 4

Full replacement of the water in benzoyl peroxide paste with a glycol yields a significant improvement in featheredging time.

| | A | B |
|---|---|---|
| Putty, parts | 100 | 100 |
| Water, part | 0.2 | |
| Dipropylene glycol, part | | 0.2 |
| Benzoyl peroxide (1% water), parts | 2 | 2 |
| Gel time, minutes | 6 | 5½ |
| Featheredging time, minutes | 11 | 8 |

EXAMPLE 5

Methyl ethyl ketone peroxide containing 5% and 25% water content display the same relative effects as benzoyl peroxide in Example 1 and Example 3.

| | A | B | C | D | E |
|---|---|---|---|---|---|
| Putty, parts [1] | 100 | 100 | 100 | 100 | 100 |
| MEK peroxide: | | | | | |
| 5% water, part | 1 | | 1 | | [2] |
| 25% water, part | | 1 | | 1 | |
| Dipropylene glycol, parts | | | 2 | | 0.5 |
| Tripropylene glycol, part | | | | 0.5 | |
| Gel time, minutes | 4¼ | 6 | 4¼ | 5¾ | 4¼ |
| Featheredge time, minutes | 7 | 9¼ | 6½ | 8½ | 6½ |
| Difference, minutes | 2¾ | 3¼ | 2 | 2¾ | 2¼ |

[1] Promoted with 0.5% dimethylaniline and 0.1% of (12%) cobalt octoate.
[2] 2% of a 50% paste of cyclohexanone peroxide in dibutyl phthalate.

EXAMPLE 6

Several unsaturated polyester-vinyl monomer resins compounded into auto body putty all show similar increase in adhesion on addition of dipropylene glycol.

The resins were promoted with 0.8% diethylaniline and inhibited with 0.01% methyl quinone and were made into putty with 50% talc and cured with 2% of benzoyl peroxide paste (50%). Water content of the putty was 1.2–1.5% and of the paste 2–3%.

| Putty composition | A | | B | | C | | D | |
|---|---|---|---|---|---|---|---|---|
| Dipropylene glycol (percent) | 0 | 1 | 0 | 1 | 0 | 1 | 0 | 1 |
| Gel time (min.) | 5 | 4¾ | 6½ | 6 | 5¾ | 5¾ | 4½ | 4¼ |
| Featheredge time (min.) | 10 | 8 | 11 | 9 | 11 | 9 | 9 | 8 |

Note.—A=29% styrene and 71% of a resin prepared from 0.6 mole phthalic anhydride, 0.4 mole fumaric acid and 1.1 mole diethylene glycol; B=34% styrene and 66% of a resin prepared from 0.8% isophthalic acid, 0.2 mole fumaric acid and 1.1 mole diethylene glycol; C=33% styrene and 67% of a resin prepared from 0.33 mole phthalic anhydride, 0.33 mole adipic acid, 0.33 mole of fumaric acid and 1.1 mole of diethylene glycol; D=35% p-methyl styrene, 65% of a resin prepared from 0.55 mole of phthalic anhydride, 0.45 mole of maleic anhydride and 1.1 mole of diethylene glycol.

EXAMPLE 7

An auto body putty prepared as described in Example 1 promoted with 0.8% of diethylaniline and containing 0.3% dipropylene glycol was initiated with the following diacyl or diaroyl peroxides:

| | Peroxide conc., percent | Gel time, min. | Feather-edge time, min. | Difference, min. |
|---|---|---|---|---|
| Benzoyl peroxide | 1 | 5 | 8½ | 3½ |
| p-Methylbenzoyl peroxide | 1¼ | 10 | 18 | 8 |
| p-Chlorobenzoyl peroxide | 1¼ | 4 | 7½ | 3½ |
| Lauroyl peroxide | 2 | 40 | 100 | 60 |

We claim:

1. The process of producing a polymerizable composition having superior adhesion properties consisting essentially of the steps of mixing a composition comprising 40–60% of an unsaturated polyester-vinyl monomer resin containing a minor amount of dialkylaryl amine, 40–60% talc and 0–1.5% water; adding 0.1–3% of a glycol selected from the group consisting of dipropylene glycol and tripropylene glycol; and polymerizing said composition by the addition of 0.5–3% of an organic peroxide composition containing 0–18% water, the organic peroxide selected from the group consisting of diaroyl peroxides and lower ketone peroxides.

2. The process of claim 1 in which the organic peroxide is selected from the group consisting of benzoyl peroxide and methyl ethyl ketone peroxide.

3. The process of claim 2 in which the organic peroxide composition contains 0–5% water.

4. The process of claim 3 in which the organic peroxide is benzoyl peroxide.

5. The process of claim 3 in which the organic peroxide is methyl ethyl ketone peroxide.

6. The process of claim 4 in which the glycol concentration is from 0.1–1.0%.

7. The process of claim 6 in which the glycol is dipropylene glycol.

8. The process of claim 6 in which the glycol is tripropylene glycol.

References Cited
UNITED STATES PATENTS 3,631,217   12/1971   Rabenold _____ 260—40 R X MORRIS LIEBMAN, Primary Examiner S. M. PERSON, Assistant Examiner U.S. Cl. X.R.

260—29.2 E, 33.2, 861